United States Patent [19]

Beneke

[11] 4,194,606

[45] Mar. 25, 1980

[54] LOW INERTIA CLUTCH AND BRAKE SYSTEM HAVING SAFETY OPERATION FEATURES

[75] Inventor: Jene A. Beneke, McKinney, Tex.

[73] Assignee: Verson Allsteel Press Company, Dallas, Tex.

[21] Appl. No.: 832,198

[22] Filed: Sep. 12, 1977

[51] Int. Cl.² ............... F16D 67/04; F16D 66/00
[52] U.S. Cl. ................... 192/18 A; 188/1 A; 192/30 W; 192/87.17
[58] Field of Search ............ 192/18 A, 30 W, 4 R, 192/87.17; 188/1 A, 16

[56] References Cited

U.S. PATENT DOCUMENTS

| | | | |
|---|---|---|---|
| 2,009,031 | 7/1935 | Rode et al. | 192/18 A |
| 2,441,543 | 5/1948 | Longfeild | 192/18 A |
| 2,844,782 | 7/1958 | Wentworth | 192/30 W |
| 2,919,778 | 1/1960 | Aschauer | 192/87.17 |
| 3,595,353 | 7/1971 | Beneke | 192/87.17 |
| 3,802,257 | 4/1974 | Jorenda et al. | 188/1 A |
| 3,887,040 | 6/1975 | Simon et al. | 188/1 A |
| 3,931,727 | 1/1976 | Luenser | 188/1 A |
| 3,975,706 | 8/1976 | Kato | 188/1 A |
| 4,051,933 | 10/1977 | Beneke et al. | 192/18 A |

Primary Examiner—Allan D. Herrmann
Attorney, Agent, or Firm—Richards, Harris & Medlock

[57] ABSTRACT

The specification discloses a clutch and brake system wherein low and high speed clutch assemblies are mounted about a rotatable shaft. A brake assembly is disposed between the low and high speed clutch assemblies and includes friction surfaces mounted about the shaft. The brake assembly is normally biased to an engaged position to prevent rotation of the shaft. A housing is disposed about the brake assembly and annular pistons are slidably mounted in the housing on opposite sides of the brake assembly. The pistons are operable in response to fluid pressure to selectively disengage the brake assembly while engaging a selected one of the clutch assemblies. Structure is provided to interconnect the pistons to prevent simultaneous engagement of both the clutch assemblies. Structure is also provided to sense a temperature above a predetermined level in the pistons in order to cause deenergization of the clutch and brake system. Structure is also provided to detect a predetermined amount of wear of the friction surfaces of the brake assembly and for alerting the operator to such wear.

32 Claims, 4 Drawing Figures

LOW INERTIA CLUTCH AND BRAKE SYSTEM HAVING SAFETY OPERATION FEATURES

FIELD OF THE INVENTION

This invention relates to clutch and brake assemblies, and more particularly relates to a low inertia clutch and brake system and associated safety features for use on presses, press brakes and the like.

THE PRIOR ART

It is commonly known to utilize clutch and brake combinations in order to provide braking and two speed operation of metal forming machines such as presses and press brake systems. For example, U.S. Pat. No. 3,498,424, issued Mar. 3, 1970, assigned to the present assignee and entitled "Multiple Speed Mechanical Transmission Shift System", discloses such a two speed system which requires the use of a separate drive friction brake in order to stop the rotating shaft when desired. Such systems in some instances have been subject to an undesirable mode of operation when both a clutch and brake are simultaneously engaged. U.S. Pat. No. 3,896,911, issued July 29, 1975, assigned to the present assignee and entitled "Two Speed Clutch and Brake System", discloses a two speed clutch system in combination with a "wet" or oil lubricated brake, with structure to prevent simultaneous energization of the brake and either of the clutches.

In copending patent application Ser. No. 598,250, filed July 23, 1975, and entitled "Two-Speed Transmission Having Enclosed Flywheel", assigned to the present assignee, a system is disclosed wherein a flywheel is mounted within the lubrication housing adjacent a duplex clutch and brake system. In copending patent application Ser. No. 667,700, filed Mar. 17, 1976, and entitled "Low Inertia Clutch and Brake System", assigned to the present assignee, a very low inertia clutch and brake system is disclosed wherein brake and clutch actuated pistons are stationarily disposed within a stationary housing.

While all of the above-noted clutch and brake systems operate well in practice, it has become desirable to provide structure to prevent simultaneous engagement of both clutches in order to prevent possible damage to the transmission mechanism due to the different clutch ratios involved. Furthermore, it is desirable to provide structure to detect overheating of the rotating portions of the clutch and brake assembly. And further, a need has arisen for structure to determine when the friction plates of the brake have become sufficiently worn that replacement is desirable. It has also become desirable to provide a low inertia clutch system in combination with a system having the flywheel enclosed within the lubrication housing.

SUMMARY OF THE INVENTION

In accordance with the present invention, a clutch and brake system includes a rotatable shaft with high and low speed clutch assemblies spaced apart along the shaft. A brake assembly is disposed between the low and high speed clutch assemblies and includes structure for normally preventing rotation of the shaft. The low and high speed clutch assemblies may be selectively actuated while simultaneously engaging the brake assembly in order to rotate the shaft at either of two speeds. Structure is associated with the brake assembly for preventing simultaneous engagement of both the clutch assemblies.

In accordance with a more specific aspect of the invention, a low inertia clutch and brake system includes a rotatable shaft. A low speed clutch assembly includes friction clutch surfaces mounted about the shaft. A high speed clutch assembly includes friction clutch surfaces mounted about the shaft and spaced from the low speed clutch assembly. A brake assembly is disposed between the low and high speed clutch assemblies and includes friction surfaces mounted about the shaft. The brake assembly is normally biased to an engaged position to prevent rotation of the shaft. A stationary housing is disposed about the brake assembly. Pistons are slidably mounted in the housing on opposite sides of the brake assembly and are operable in response to fluid pressure to selectively disengage the brake assembly and to engage a selected one of the clutch assemblies. Fluid pressure may be selectively applied to either of the pistons in order to disengage the brake assembly and to engage one of the clutch assemblies. Structure interconnects the pistons to prevent simultaneous engagement of both the clutch assemblies. One of the pistons has a larger fluid pressure receiving surface than the other of the pistons in order to ensure that a predetermined one of the clutch assemblies is energized in case of simultaneous application of pressurized fluid to both of the pistons.

In accordance with yet another aspect of the invention, a low inertia clutch-brake assembly is provided wherein a brake is located between a rotating shaft and is disposed between two clutch assemblies. A pair of nonrotating annular pistons are disposed about the shaft on opposite sides of the brake. A plurality of biasing members are attached to each of the pistons and are disposed radially outwardly from the brake. Springs are disposed in association with the biasing members for exerting a biasing force against the biasing members to normally bias the pistons toward one another to normally engage the brake. Pressurized fluid may be admitted against a selected one of the pistons to disengage the brake and to engage one of the clutch assemblies. Rigid structure interconnects the pistons to prevent simultaneous engagement of both of the clutch assemblies. Structure is provided to sense the temperature within a selected portion of the pistons and is interconnected with circuitry to terminate operation of the clutch-brake assembly if a predetermined temperature is detected. In addition, structure is provided to determine when the pistons move to a predetermined distance from one another in order to provide an indication that the friction plates of the brake need maintenance or replacement.

In accordance with a more specific aspect of the invention, a clutch and brake system is provided which includes a rotatable shaft, along with a low speed clutch assembly including friction clutch surfaces mounted about the shaft. A high speed clutch assembly includes friction clutch surfaces mounted about the shaft and spaced from the low speed clutch assembly. A brake assembly is disposed between the low and high speed clutch assemblies and includes friction surfaces mounted about the shaft. The brake assembly normally is engaged to prevent rotation of the shaft. A stationary housing is disposed about the brake assembly and engages outer peripheries of ones of the friction surfaces, the housing having a plurality of lateral apertures annularly spaced about the housing. First and second annular nonrotating pistons are disposed about the shaft and are laterally slidable in the housing. The pistons have piston surfaces disposed radially outwardly of the housing and have brake engaging surfaces for abutting the sides of the brake assembly which are disposed radially inwardly from the piston surfaces. A first plurality of rigid biasing members are connected at one end to the first piston and extend through alternate ones of the apertures in the housing. A second plurality of rigid biasing members are connected one end to the second piston and extend through the remaining alternate ones of the apertures in the housing. Springs are disposed about the biasing members within the apertures in the housing for biasing the pistons toward one another for normally causing the brake assembly to be engaged. Structure is provided in the housing for directing pressurized fluid to a selected one of the piston surfaces to move one of the pistons to engage one of the clutch assemblies and to disengage the brake assembly. Structure interconnects the first and second pistons to prevent simultaneous engagement of both the clutch assemblies.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
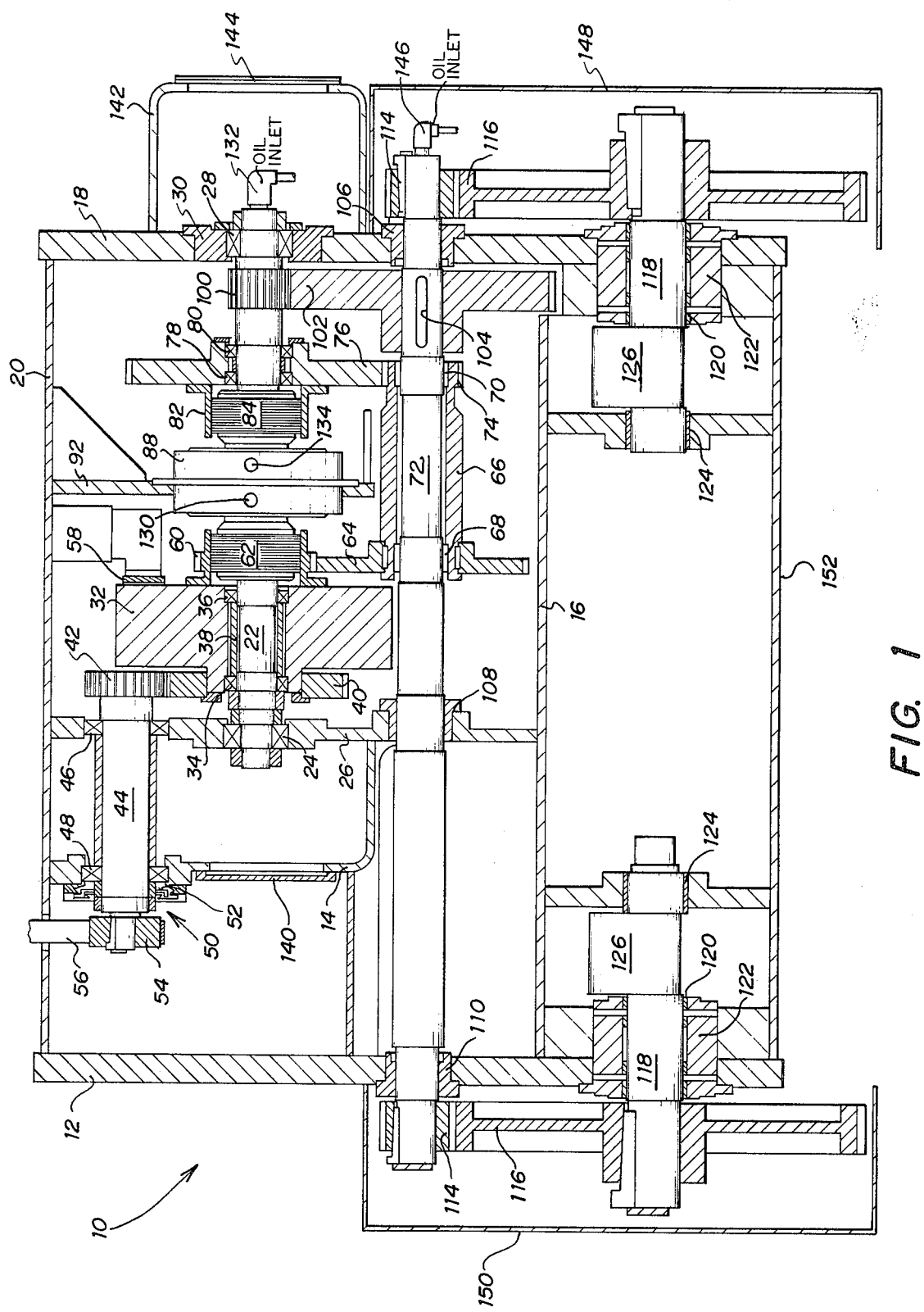
FIG. 1 is a partially sectioned view of a press clutch and brake assembly for use in a press brake system.

Referring to FIG. 1, a transmission 10 is illustrated which is particularly useful for a metal forming machine such as a press brake system. A housing 12 supports the transmission, with an oil tight lubrication housing being defined by housing walls 14, 16, 18 and 20. The oil housing thus formed encloses an area in which the mechanical transmission of the invention operates with oil lubrication being applied thereto.

A rotating shaft 22 is journaled for rotation at one end by bearings 24 and oil seals which are mounted in the housing wall 26. The other end of the shaft 22 is journaled in bearings 28 which are mounted within an annular bearing housing 30. Bearing housing 30 is attached by suitable bolts to the housing wall 18.

A flywheel 32 is rotatably mounted on shaft 22 by bearings 34 and 36. A bearing spacer 38 is disposed between the bearings. The flywheel 32 is disposed within the oil housing, and expensive oil seals are not required between the flywheel and the shaft 22. A flywheel gear 40 is fixedly attached to one side of the flywheel 32 and includes gear teeth which mesh with a drive gear 42. Drive gear 42 is attached to an end of a flywheel pinion shaft 44 which is journaled in bearings 46 and 48 in housing walls 26 and 14.

The end of the pinion shaft 44 is directed through an oil seal 50 which includes an oil slinger 52. An oil drain is provided in the lower portion of the oil seal. The end of the pinion shaft 44 thus extends outward from the enclosed oil housing in order to receive drive through a sprocket or pulley 54. In the preferred embodiment, a belt 56 is connected to a motor, to be subsequently shown, in order to rotate the pulley 54. Alternatively, a chain may be utilized to drive a sprocket in order to rotate the pinion shaft 44. Rotation of the pinion shaft 44 provides rotation through the gears 40 and 42 to the flywheel 32.

The system thus described is similar to the system disclosed in pending U.S. application Ser. No. 598,350, filed July 23, 1975.

A flywheel brake pad 58 is provided adjacent flywheel 32. A first reduction pinion 60 is attached by bolts or the like to a face of the flywheel 32. Reduction pinion 60 includes a spider gear portion which engages the outer periphery of ones of a plurality of friction clutch surfaces which form a high speed clutch 62. Teeth formed on the exterior of the reduction pinion 60 engage the teeth of a first reduction gear 64 which is keyed to an idler gear shaft 66. The gear shaft is rotatably mounted by bushings 68 and 70 about an intermediate shaft 72. A second reduction pinion 74 is formed on the end of the idler shaft 66 and meshes with teeth on a second reduction gear 76. Gear 76 is journaled in bearings 78 and 80 about shaft 22. A clutch drive ring 82 is rigidly attached to one face of the gear 76 and engages the outer periphery of ones of a plurality of friction clutch surfaces which form a low speed clutch 84.

A brake assembly housing 88 is disposed between the high speed and low speed clutches and comprises a plurality of annular friction surfaces, to be subsequently described. The housing 88 is rigidly attached to a wall 92. Clutch pistons and brake plates, to be subsequently described, are disposed within housing 88. The clutch-brake assembly thus described provides a very low inertia system as more fully described in copending patent application Ser. No. 667,700, filed Mar. 17, 1976, and entitled "Low Inertia Clutch and Brake System".

A drive pinion 100 is rigidly formed on an end of shaft 22 and meshes with an intermediate gear 102. Gear 102 is attached by a key 104 to the intermediate shaft 72. Intermediate shaft 72 is journaled in a bushing 106 in housing wall 18. Intermediate shaft 72 is also journaled in bushings 108 in housing wall 26 and in bushings 110 in the wall of housing 12. The intermediate shaft 72 is surrounded by and supports the idler gear shaft 66 in the manner previously described.

The outer ends of the intermediate shaft 72 are connected to two bull pinions 114, each of which mesh with a bull gear 116. Bull gears 116 are connected to shafts 118 which are mounted in bushings 120 carried by main bushing housing 122. Inner main bushings 124 support the inner ends of the bull gear shafts 118. Bull cams 126 are thus rotated to provide drive to a metal forming machine such as a press brake, in the well-known manner.

The clutches of the present system are operated by pressurized air, although it will be apparent that other pressurized fluid can be utilized for energization of the clutches. An air inlet 130 is attached to a source of pressurized air and is connected to the housing 88, as will be subsequently described. An oil inlet 132 is connected to a source of pressurized oil and comprises a rotary union connected to the end of shaft 22 in order to supply lubricating oil through apertures in the shaft 22 to the clutches. An air inlet 134 is connected to a source of pressurized air and connects to the housing 88. A cover plate 140 may be removed from wall 14 for access to the end of shaft 22. Oil inlet 132 is covered by a wall 142 attached to housing wall 18. A cover 144 may be removed for access to the oil inlet 132.

An oil inlet 146 comprises a rotary union attached to the end of intermediate shaft 72 and attached to a source of pressurized oil for lubrication. A housing cover 148 is disposed over the oil inlet and the bull drive gears. A housing cover 150 covers the other bull gear assembly. A bottom housing 152 is connected beneath housing walls 12 and 18 in order to encompass the bull drive system.

In operation of the system shown in FIG. 1, if pressurized air is not applied to either the high speed clutch 62 or the low speed clutch 84, the brake is energized, thereby braking rotation of shaft 22. In the brake position, the flywheel 32 is continuously rotated about shaft 22 by rotation of the drive gear 42. When it is desired to operate the system in high gear, pressurized air is applied through the air inlet 130 in order to energize the high speed clutch 62. In a manner to be subsequently described, the clutch surfaces 62 are compressed in order to provide rotative drive from the flywheel 32 through the reduction pinion 60 and the clutch surfaces 62 to the shaft 22. Shaft 22 is then rotated at the high speed, and the drive pinion 100 causes rotation of an intermediate gear 102 which rotates the intermediate shaft 72. Rotation of intermediate shaft 72 causes rotation of the bull gears 116 and the cams 126. During operation in the high speed, the idler gear shaft 66, gear 64 and pinion 74 are rotated, thereby causing rotation of gear 76. However, inasmuch as the low speed clutch surfaces 84 are not energized, drive is not imparted from the gear 76 to the shaft 22.

When it is desired to operate the shaft 22 in the low speed, pressurized air is applied through the air inlet 134 in order to compress the clutch surfaces 84. The high speed clutch surfaces 62 and the brake are not energized in this mode. The flywheel 32 thus transmits rotation through first reduction gear 64 and pinion 74 to the second reduction gear 76. Gear 76 then transmits rotation through the engaged clutch surfaces 84 to the shaft 22 for rotation of the shaft 22 in a low speed. The drive pinion 100 thus causes rotation of the bull gears through the intermediate shaft 72 at the low speed. When both of the high speed and low speed clutches are de-energized, the brake is automatically set in order to terminate rotation of shaft 22, thereby stopping rotation of the bull gears 116.

As previously noted, the present invention utilizes only a single shaft 22, and does not require two accurately aligned split shafts arranged in an end-to-end relationship as in previously developed transmissions. Moreover, the flywheel 32 is maintained within the oil housing, and is therefore automatically lubricated and expensive oil seals are not required.

Figure 2:
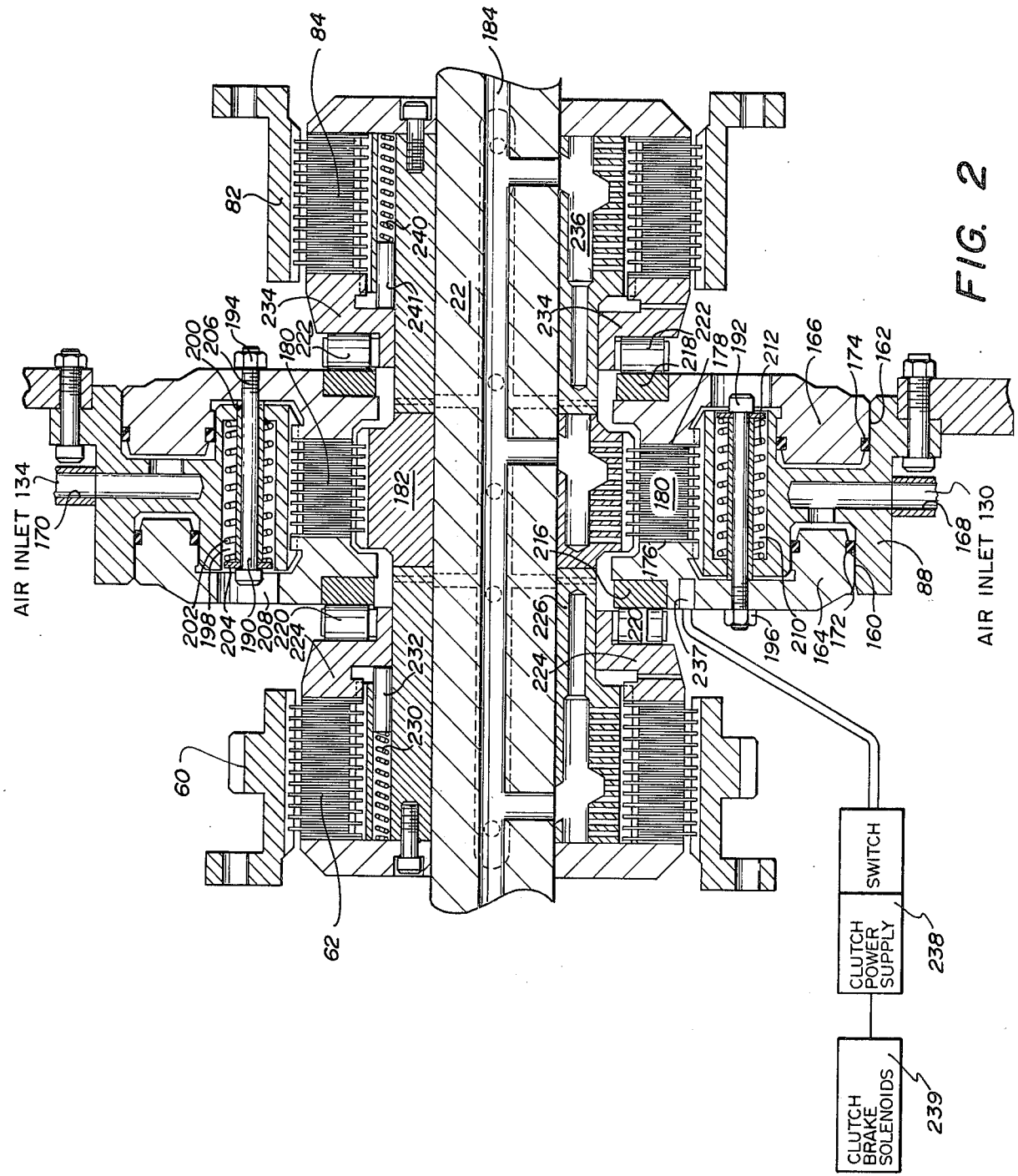
FIG. 2 is a sectional view of the low inertia clutch and brake system illustrating the temperature sensing system of the invention.

FIG. 2 is a partially sectioned drawing of the clutch and brake system of the present invention, wherein like numerals are utilized for like and corresponding parts previously described in FIG. 1. Stationary housing 88 may be seen to comprise annular chambers 160 and 162 formed in the sides thereof for receiving annular pistons 164 and 166 respectively. Pistons 164 and 166 are splined to the housing 88 to prevent relative rotation between the pistons and the housing. Pressurized fluid may be applied to chamber 160 through the inlet 130 and through an aperture 168 formed through housing 88. Pressurized fluid may be applied to chamber 162 through the inlet 134 and through an aperture 170 formed through the end of housing 88 in the manner illustrated. In this manner, pistons 164 and 166 may be selectively forced laterally away from the housing 88 in order to selectively energize one of the clutch assemblies 62 or 84. An important aspect of the present invention is that the fluid receiving surface of piston 166 is larger than the fluid receiving surface of piston 164. In this way, as will be subsequently described in more detail, the slow clutch 84 will be energized before the fast clutch 62 in case pressurized fluid was inadvertently simultaneously applied to both pistons 164 and 166.

Seals 172 and 174 are placed between the chambers 160 and 162 and the pistons 164 and 166. An important aspect of the invention is that the fluid receiving surfaces of the pistons 164 and 166 are disposed radially outwardly from the brake assembly. This allows the use of the thin, diametrically large brake assembly housing 88. Such a construction was not possible in prior systems wherein the pistons rotated with the shaft, due to the increased inertia which would result from such a configuration.

Piston 164 includes a brake engaging surface 176 which is adapted to bear against the side of the brake assembly. Similarly, piston 166 includes a brake engaging surface 178 for engaging the opposite side of the brake assembly. The brake assembly includes a plurality of friction clutch surfaces 180 annularly disposed about the shaft 22. A first set of the friction brake surfaces 180 are engaged by teeth about a brake hub 182 which is keyed to the shaft 22. The brake assembly also includes a second set of friction surfaces 180 which alternate with the first set and are keyed at their outer periphery to teeth about the stationary brake housing 88.

When the pistons 164 and 166 are in their inward position, the brake engaging surfaces 176 and 178 cause the two sets of friction brake surfaces 180 to be engaged to thereby stop rotation of the shaft 22. Lubricating oil is applied through the shaft 22 through a passageway 184 through the center thereof. The oil is applied through the illustrated passages in the brake hub 182 in order to supply the brake assembly with lubricating oil. The brake assembly friction surfaces are thus of the "wet disk" type.

A first set of eight biasing members or bolts 190 mounted at spaced points about piston 166 and a second set of eight bolts 192 are disposed about piston 164. The bolts 190 and 192 are radially spaced at alternate points about the housing 88 and extend through apertures formed in the housing 88 in the manner described in copending application Ser. No. 667,700. Each of the bolts 190 include a socket head and the bolts are attached to the piston 166 by nuts 194. Similarly, each of the bolts 192 includes a socket head and are attached by nuts 196 to piston 164.

A plurality of circular chambers 198 are defined in the housing 88 to accommodate each of the eight bolts 190. The chambers 198 are formed as a counterbore, with a smaller dimension aperture 200 extending through one side of the housing 88 into the counterbore to accommodate the passage of the bolt 190 and a spacer which surrounds the bolt. A spring 202 is disposed about each of the bolts 190. A spring washer 204 is fixed adjacent the socket head of each bolt in order to abut one end of the spring 202. Spring 202 is thus compressed between the end of chamber 198 and the spring washer 204 in order to normally urge the piston 166 into engagement with the brake assembly. An aperture 206 is defined through piston 166 to accommodate the bolt 190. Apertures 208 are formed through piston 164 in order to accommodate the socket head of the bolt 190.

In a similar manner, chambers 210 are defined by a counterbore through the housing 88. Circular chambers 198 and 210 are alternately spaced next to one another and are formed from opposite sides of the housing 88. The chambers 210 and the accompanying structure are identical to chambers 198, and will not thus be described in detail. A spring 212 is biased between a washer and the bottom of the chamber 210 in order to bias the piston 164 normally against the brake assembly. An aperture is formed in piston 166 to accommodate the socket head of the bolt while an aperture is formed through piston 164 to allow passage therethrough of the bolt 192.

The bolt and spring arrangement thus illustrated serve to maintain the brake assembly normally engaged. An important aspect of the invention is that the biasing bolts 190 and 192 and their associated springs are disposed radially outwardly from the brake assembly and thus save substantial lateral space, without imparting inertia to the system, inasmuch as they are stationary.

An annular washer 216 is pressed into piston 164, while a similar annular washer 218 is pressed in adjacent piston 166. A plurality of circular roller thrust bearings 220 are disposed about an annular cage and are disposed adjacent washers 216. Similarly, a plurality of roller thrust bearings 222 are disposed in a cage disposed adjacent washer 218. The thrust bearings 220 bear against a clutch pusher plate 224 which is annularly disposed about shaft 22 and which is splined for rotation with a clutch hub 226 which is keyed to shaft 22. The clutch pusher plate 224 bears against a first set of friction clutch surfaces 62 which are splined for rotation with the clutch hub 226. A second set of friction clutch surfaces 62 are splined at their outer peripheries to pinion 60.

The two sets of clutch surfaces 62 normally rotate relative to one another. However, when piston 164 is moved axially outwardly by pressurized fluid from the housing 88, the clutch pusher plate 224 engages the friction clutch surfaces 62 in order to energize the high speed clutch in the manner previously described with respect to FIG. 1. A spring 230 is disposed adjacent a plunger 232 which normally exerts a small force against the clutch pusher plate 224 toward the housing 88 in order to prevent the roller thrust bearings 220 from slipping out of their cage.

Oil is provided to the high speed clutch through passageways in the clutch hub 226. A plurality of oil apertures also communicate between the aperture 206 and the clutch surfaces 62 for lubrication thereof.

In a similar manner, a clutch pusher plate 234 is splined to a low speed clutch hub 236 which is keyed for rotation with shaft 22. The clutch pusher plate 234 bears against the thrust bearings 222, and a spring 240 and a plunger 241 operate to prevent the bearings 222 from slipping from their cage. The low speed clutch plates 84 include a first set of friction clutch surfaces which are splined at their inner peripheries to the low speed clutch hub 236, and a second set of friction clutch surfaces which are splined at their outer peripheries to the clutch drive ring 82. When piston 166 moves outwardly from housing 88, the clutch pusher plate 234 is moved against the friction clutch surfaces 84 in order to engage the low speed clutch in the manner previously described.

Lubricating oil is supplied through a passageway to the clutch hub 236. Apertures are formed through the clutch hub 236 in order to provide oil to the friction clutch surfaces 84.

A heat sensor 237 is disposed within the piston 164 in the general region of the bearings 220. The provision of the heat sensor 237 is possible due to the fact that piston 164 is nonrotating. The heat sensor 237 is interconnected by wires to a switch which is interconnected to the clutch power supply 238 which supplies the power to actuate the clutch brake solenoid 239.

The heat sensor 237 and the switch are set so that the switch is normally off and the power supply 238 thus enables the solenoid 239 to be operated in the conventional manner. However, when the heat sensor 237 detects a predetermined high temperature, thereby indicating possible problems with the bearing 220, the switch opens, terminating supply of power from the power supply 238 to the clutch brake solenoid 239. This causes the system to be shut down to enable the excessive heat generation to be checked and corrected before damage is done to the bearings. Although only one heat sensor 237 is illustrated, it will be of course understood that one or more heat sensors could be utilized in conjunction with piston 166.

For an addition description of the pistons and stationary housing of the invention, reference is made to the description of previously identified copending patent application Ser. No. 667,700.

Figure 3:
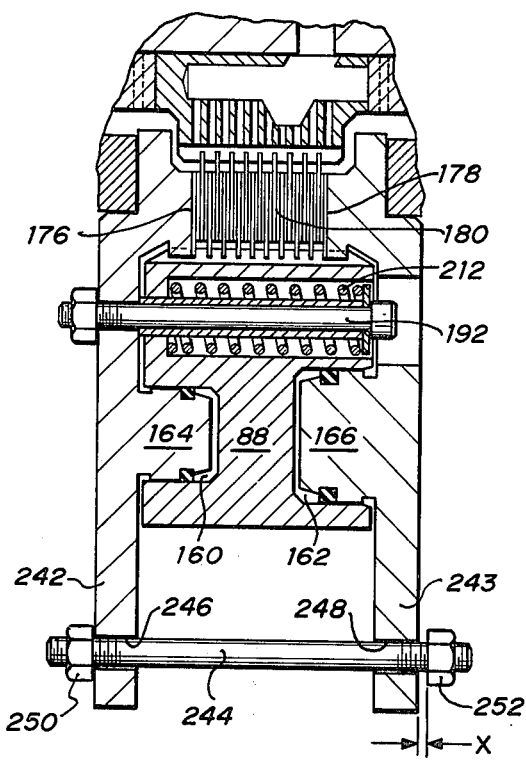
FIG. 3 is a sectional view of a portion of the brake housing and slidable pistons of the invention, illustrating the interconnection of the pistons to prevent simultaneous engagement of both of the clutch assemblies.

FIG. 3 illustrates a sectioned view of the lower portion of the brake housing 88, the section being taken along a radial angle spaced from the section shown in FIG. 2. Like numerals are utilized in FIG. 3 for like and corresponding parts previously identified. In this view, radial extension members 242 and 243 may be seen to extend radially outwardly from pistons 164 and 166. It will be understood that a plurality of similar extension members are disposed at spaced apart locations about the periphery of the pistons 164 and 166. A fastening member such as a rigid bolt 244 extends through apertures 246 and 248 in the extension members 242 and 243. A nut 250 is threadedly disposed on one end of the bolt 244, while a nut 252 is disposed on the opposite end of the bolt 244. The nutse 250 and 252 are adjusted so that when nut 250 abuts the outer edge of the extension member 242, a small distance indicated as "X" exists between the nut 252 and the outer edge of the extension member 243.

The pistons 164 and 166 are illustrated in their normal operating position, whereby they are urged against brake plates 180 in order to energize the brake. In normal operation, one of the pistons 164 or 166 is energized by fluid pressure in order to move laterally away from the housing 88 to energize one of the clutches. The distance "X" shown in FIG. 3 between the nut 252 and the exterior wall of the extension member 243 is sufficient to allow either of the pistons 164 or 166 to move relative to the other in order to normally energize their respective clutch. However, the distance "X" shown in FIG. 3 is chosen to be sufficiently small to prevent simultaneous engagement of both clutches in case pressurized fluid is inadvertently applied to both pistons 164 and 166.

In operation of the invention shown in FIG. 3, as previously noted, the pistons 164 and 166 operate in the manner previously described in order to selectively energize one of the clutches. However, if fluid pressure is simultaneously applied to both of the pistons 164 and 166, due to the larger fluid receiving surface of piston 166, piston 166 would be moved laterally from housing 188 in order to energize the slow clutch 84. Due to the bolt 244 and the nuts 250 and 252, the piston 164 would be restrained and could not be moved laterally from the housing 88 in order to energize the fast clutch. In case of a possible malfunction, only the slow clutch would be energized.

It will be understood that a plurality of bolts 244 would be disposed at symmetrical points about the periphery of the pistons 164 and 166 to provide symmetry of operation. By the provision of the piston interconnecting structure shown in FIG. 3, the system may thus be operated in the normal manner. However, the pistons 164 and 166 are interconnected by bolts 244 to prevent simultaneous engagement of both of the clutches and thereby possibly causing clutch damage due to the different gear ratios involved.

Figure 4:
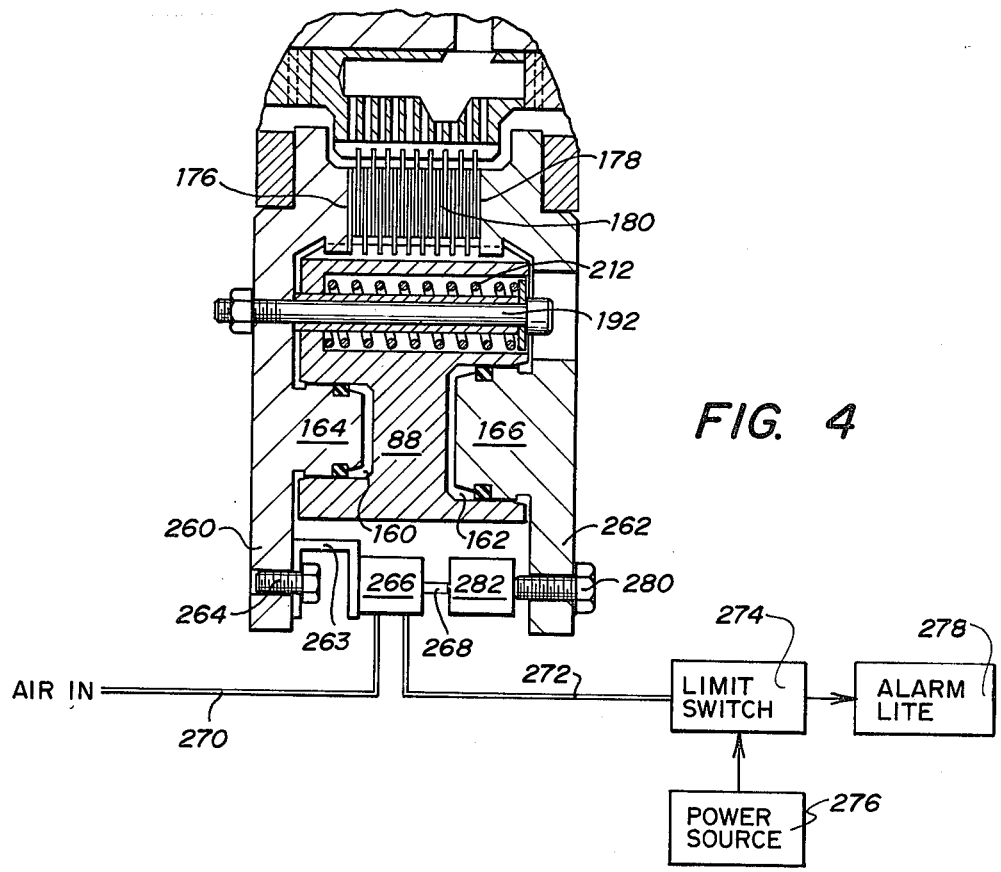
FIG. 4 is a sectional view of another portion of the brake housing and slidable pistons illustrating the brake plate wear detection system of the invention.

FIG. 4 illustrates a sectional view taken along another radial angle different from the sections shown in FIGS. 2 and 3. FIG. 4 illustrates extension members 260 and 262 which integrally radially extend from pistons 164 and 166. Angle bracket 263 is rigidly attached by the bolt 264 to the extension member 260. A normally closed air switch 266 is mounted on the angle bracket 263 and includes a plunger 268 extending therefrom. Pressurized air is applied to a conduit 270 to the air switch and, when switch 266 is open, the air is applied through the switch 266 to an outlet conduit 272 to a limit switch 274. Limit switch 274 is normally open and therefore does not normally apply electrical power from a power source 276 to an alarm light 278. Limit switch 274 is closed in response to the application of the pressurized air.

A bolt 280 is rigidly connected through the extension member 262 and includes a cylindrical contact member 282 which is threadedly engaged on the end of bolt 280. Member 282 may be rotated relative to the bolt 280 in order to enable adjustment of its position. Member 282 is normally adjusted relative to the bolt 280 to a position closely adjacent the plunger 268, but not engaging the plunger 268.

In operation of the system, when the brake plates 180 have normal wear, the plunger 268 is not contacted by the member 282 and thus air is not applied to the limit switch. Switch 266 is normally closed and thus pressurized air is not normally provided through conduit 272 to the limit switch 274. The limit switch 274 is thus normally off and alarm light 278 is not lit. However, when the brake plates 180 begin to wear to the point where it is desirable to replace the clutch surfaces, pistons 164 and 166 will be moved toward one another when the brake is engaged to the point that member 282 engages and depresses the plunger 268. When plunger 268 is depressed, the air switch 266 is opened, thereby allowing the passage of pressurized air from conduit 270 to conduit 272. The limit switch 274 senses the pressurized air and becomes closed.

Closure of the limit switch 274 applies power from the power source 276 to the alarm light 278 to energize same. The alarm light 278 thus indicates to the operator that the brake plates are sufficiently worn that replacement is desirable or imminent. Of course, it will be understood that an audible alarm may be utilized in place of or in conjunction with the alarm light 278. In addition, if desired, closure of the limit switch 274 may be utilized in order to disable the entire clutch brake system until the clutch plates 180 are replaced.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A clutch and brake system comprising:
   a rotatable shaft,
   a low speed clutch assembly mounted about said shaft,
   a high speed clutch assembly mounted about said shaft and spaced from said low speed clutch assembly,
   a brake assembly disposed between said low and high speed clutch assemblies and including means for normally preventing rotation of said shaft,
   first and second means for selectively actuating either of said low and high speed clutch assemblies, respectively, while disengaging said actuated means from said brake assembly in order to rotate said shaft, and
   means associated with said brake assembly for permitting said first and second means to simultaneously engage said brake assembly and for preventing simultaneous engagement of both said clutch assemblies.

2. The clutch and brake system of claim 1 and further comprising:
   a pair of pistons mounted on opposite sides of said brake assembly and each operable to engage a selected one of said clutch assemblies while disengaging said brake assembly, and
   means for interconnecting said pistons to prevent simultaneous engagement of said clutch assemblies and to permit simultaneous engagement of said brake assembly.

3. The clutch and brake assembly of claim 2 and further comprising:
   spring biased means associated with each of said pistons and disposed radially outwardly of said brake assembly for normally urging said pistons toward said brake assembly to normally engage said brake assembly.

4. The clutch and brake assembly of claim 2 and further comprising:
   means for selectively applying fluid pressure to one of said pistons in order to cause engagement of a selected one of said clutch assemblies, and
   one of said pistons having a larger fluid pressure receiving surface than the other of said pistons.

5. The clutch and brake assembly of claim 2 and further comprising:
   means disposed between said pistons for sensing a predetermined spacing between said pistons, and
   alarm means operable in response to said sensing means to indicate undesirable brake wear.

6. The clutch and brake assembly of claim 2 and further comprising:
   heat sensing means disposed in one of said pistons, and
   means operable in response to detection of a predetermined temperature for generating an overheating alarm signal.

7. A low inertia clutch and brake system comprising:
   a rotatable shaft, a low speed clutch assembly including friction clutch surfaces mounted about said shaft, a high speed clutch assembly including friction clutch surfaces mounted about said shaft and spaced from said low speed clutch assembly, a brake assembly disposed between said low and high speed clutch assemblies and including friction surfaces mounted about said shaft, said brake assembly normally biased to an engaged position to prevent rotation of said shaft, a stationary housing disposed about said brake assembly, first and second piston means slidably mounted in said housing on opposite sides of said brake assembly, each of said means being selectively actuated in response to fluid pressure to disengage said actuated means from said brake assembly and to engage a selected one of said clutch assemblies, means for selectively applying fluid pressure to one of said piston means in order to disengage said actuated means from said brake assembly and to engage one of said clutch assemblies, and means for interconnecting said piston means to permit said piston means to simultaneously engage said brake assembly and to prevent simultaneous engagement of both said clutch assemblies.

8. The low inertia clutch and brake system of claim 7 wherein one of said piston means has a larger fluid pressure receiving surface than the other of said piston means.

9. The low inertia clutch and brake system of claim 8 wherein said piston means are interconnected by a rigid member which allows movement of said piston means toward one another but which does not allow movement of said piston means away from each other beyond a predetermined distance.

10. The low inertia clutch and brake system of claim 8 wherein said predetermined distance is sufficient to allow either of said clutch assemblies to be individually energized but sufficient to prevent simultaneous engagement of both said clutch assemblies.

11. The low inertia clutch and brake system of claim 8 and further comprising:
   means disposed between said piston means for sensing a predetermined spacing between said piston means, and
   alarm means operable in response to said sensing means to indicate undesirable spacing between said pistons.

12. The low inertia clutch and brake system of claim 8 and further comprising:
   heat sensing means disposed in one of said piston means, and
   means operable in response to detection of a predetermined temperature for generating an overheating alarm signal.

13. In a low inertia clutch-brake assembly wherein a brake is located between a rotating shaft and is disposed between two clutch assemblies, the combination comprising:
   a pair of non-rotating annular pistons disposed about said shaft on opposite sides of the brake,
   a plurality of biasing members attached to each of said pistons and disposed radially outwardly from said brake,
   springs disposed in association with said biasing members for exerting a biasing force against said biasing members to normally bias said pistons toward one another to normally engage the brake,
   means for admitting pressurized fluid against a selected one of said pistons to disengage said actuated piston from the brake and to engage one of the clutch assemblies, and
   means for interconnecting said pistons to permit both of said pistons to simultaneously engage the brake and preventing simultaneous engagement of both of the clutch assemblies.

14. The combination of claim 13 and further comprising:
   a stationary housing containing said pistons and biasing members,
   said pistons including radially extending extensions which are rigidly interconnected.

15. The combination of claim 13 and further comprising:
   means disposed between said pistons for sensing a predetermined spacing between said pistons, and
   alarm means operable in response to said sensing means to indicate undesirable spacing between said pistons.

16. The combination of claim 13 and further comprising:
   heat sensing means disposed in one of said pistons, and
   means operable in response to detection of a predetermined temperature for generating an overheating alarm signal.

17. The combination of claim 13 wherein one of said pistons has a larger fluid pressure receiving surface than the other of said pistons.

18. The combination of claim 13 wherein said interconnecting means comprises:
   an elongated rigid member slidably extending through apertures through said pistons and including means on the ends of said rigid member for limiting the travel of said pistons away from each other.

19. A clutch and brake system comprising:
   a rotatable shaft,
   a low speed clutch assembly mounted about said shaft,
   a high speed clutch assembly mounted about said shaft and spaced from said low speed clutch assembly,
   a brake assembly disposed between said low and high speed clutch assemblies and including means for normally preventing rotation of said shaft,
   first and second means for selectively actuating either of said low and high speed clutch assemblies while disengaging only the actuated means from said brake assembly in order to rotate said shaft at a predetermined speed,
   means for sensing a predetermined magnitude of wear of said brake assembly, and
   means operable in response to said sensing means to indicate undesirable brake wear.

20. The clutch and brake system of claim 19 wherein said brake assembly includes non-rotating pistons, said means for sensing disposed between said pistons.

21. The clutch and brake system of claim 20 wherein said means for sensing detects the distance between said pistons.

22. A clutch and brake system comprising:
   a rotatable shaft, a low speed clutch assembly mounted about said shaft, a high speed clutch assembly mounted about said shaft and spaced from said low speed clutch assembly, a brake assembly disposed between said low and high speed clutch assemblies and including means for normally preventing rotation of said shaft and two non-rotating pistons, means for selectively actuating either of said low and high speed clutch assemblies while disengaging said brake assembly in order to rotate said shaft at a predetermined speed, means disposed between said pistons for detecting a predetermined amount of wear of said brake assembly by sensing the distance between said pistons and including a plunger operated air switch for being actuated when said pistons move within a predetermined distance to one another, and means operable in response to said sensing means to indicate undesirable brake wear.

23. A low inertia clutch and brake system comprising:
a rotatable shaft,
a low speed clutch assembly including friction clutch surfaces mounted about said shaft,
a high speed clutch assembly including friction clutch surfaces mounted about said shaft and spaced from said low speed clutch assembly,
a brake assembly disposed between said low and high speed clutch assemblies and including friction surfaces mounted about said shaft, said brake assembly normally biased to an engaged position to prevent rotation of said shaft,
a stationary housing disposed about said brake assembly,
pistons slidably mounted in said housing on opposite sides of said brake assembly and operable in response to fluid pressure to be selectively disengaged from said brake assembly and to engage a selected one of said clutch assemblies,
means for sensing the temperature of at least one of said pistons, and
means operable in response to detection of a predetermined temperature level by said sensing means to generate an overheating alarm signal.

24. The low inertia clutch and brake system of claim 23 and further comprising:
means operable in response to said overheating alarm signal to stop operation of said clutch and brake system.

25. A clutch and brake system comprising:
a rotatable shaft,
a low speed clutch assembly including friction clutch surfaces mounted about said shaft,
a high speed clutch assembly including friction clutch surfaces mounted about said shaft and spaced from said low speed clutch assembly,
a brake assembly disposed between said low and high speed clutch assemblies and including friction surfaces mounted about said shaft, said brake assembly normally engaged to prevent rotation of said shaft,
a stationary housing disposed about said brake assembly and engaging outer peripheries of ones of said friction surfaces, said housing having a plurality of lateral apertures annularly spaced around said housing,
first and second annular non-rotating pistons disposed about said shaft and laterally slidable in said housing, said pistons having piston surfaces disposed radially outwardly of said housing and having brake engaging surfaces for abutting the sides of said brake assembly disposed radially inwardly from said piston surfaces, a first plurality of rigid biasing members connected at one end to said first piston and extending through alternate ones of said apertures in said housing, a second plurality of rigid biasing members connected at one end to said second piston and extending through the remaining alternate ones of said apertures in said housing, springs disposed about said biasing members within said apertures in said housing for biasing said pistons toward one another for normally causing said brake assembly to be engaged, means in said housing for directing pressurized fluid to a selected one of said piston surfaces to move one of said pistons to engage one of said clutch assemblies and to disengage said actuated piston from said brake assembly, and means for interconnecting said first and second pistons to prevent simultaneous engagement of both of said clutch assemblies and to permit simultaneous engagement of said first and second pistons with said brake assembly.

26. The clutch and brake system of claim 25 and further comprising:
a flywheel rotatably mounted on said shaft,
a lubrication housing enclosing the entire system, and
means for driving said flywheel from exterior of said housing.

27. The clutch and brake system of claim 26 and further comprising:
first gear means connected to said flywheel and engageable with said high speed clutch assembly,
second gear means engageable with said low speed clutch assembly,
an intermediate shaft disposed parallel to said shaft, and
idler gear means rotatably mounted on said intermediate shaft and engaged with said first and second gear means.

28. The clutch and brake system of claim 25 wherein said pistons are interconnected by a rigid member which allows movement of said pistons toward one another but which does not allow movement of said pistons away from each other beyond a predetermined distance.

29. The clutch and brake system of claim 28 wherein said predetermined distance is sufficient to allow either of said clutch assemblies to be individually energized but sufficient to prevent simultaneous engagement of both said clutch assemblies.

30. The low inertia clutch and brake system of claim 25 wherein one of said pistons has a larger fluid pressure receiving surface than the other of said pistons.

31. The clutch and brake assembly of claim 25 and further comprising:
means interconnecting said pistons for sensing a predetermined spacing between said pistons, and
alarm means operable in response to said sensing means to indicate undesirable brake wear.

32. The clutch and brake assembly of claim 25 and further comprising:
heat sensing means disposed in one of said pistons, and
means operable in response to detection of a predetermined temperature for generating an overheating alarm signal.

* * * * *

UNITED STATES PATENT AND TRADEMARK OFFICE
CERTIFICATE OF CORRECTION

PATENT NO. : 4,194,606
DATED : March 25, 1980
INVENTOR(S) : Jene A. Beneke

It is certified that error appears in the above-identified patent and that said Letters Patent are hereby corrected as shown below:

Column 8, line 28 change "addition" to --additional--;
line 46 change "nutse" to --nuts--.

Signed and Sealed this

Twenty-second Day of July 1980

[SEAL]

Attest:

SIDNEY A. DIAMOND

Attesting Officer

Commissioner of Patents and Trademarks